United States Patent [19]

Yamamoto et al.

[11] Patent Number: 4,714,849
[45] Date of Patent: Dec. 22, 1987

[54] LINEAR STEPPING MOTOR
[75] Inventors: Sakae Yamamoto, Atsugi; Tsutomu Mizuno, Kanagawa, both of Japan
[73] Assignee: Amada Company, Limited, Japan
[21] Appl. No.: 754,131
[22] Filed: Jul. 12, 1985
[30] Foreign Application Priority Data Feb. 9, 1985 [JP] Japan .................. 60-022770

[51] Int. Cl.$^4$ ........................... H02K 41/00
[52] U.S. Cl. ........................ 310/12; 318/135
[58] Field of Search .................. 310/12-14; 318/37, 38, 135

[56] References Cited
U.S. PATENT DOCUMENTS

Re. 27,289  2/1972  Sawyer ................. 318/38
4,370,577   1/1983  Wakabayashi et al. ..... 310/12
4,504,750   3/1985  Onodera et al. ......... 310/12

Primary Examiner—Donovan F. Duggan
Attorney, Agent, or Firm—Wigman & Cohen

[57] ABSTRACT

A linear stepping motor, including a pair of exciting iron cores having a plurality of field legs which form a plurality of denticles with a common pitch $\tau$; wherein, when P is the number of poles and n is the number of phases of the linear stepping motor, the spacing of the field legs is $(N+(m/n))\cdot\tau$ (where N is an integer, m is an integer, and m is an integer, and $m<n$); and the denticles on the pair of exciting iron cores are shifted in phase by no more than $(L/P)\cdot\tau$ (where L is an integer, $L<P$, and $2L\neq P$).

4 Claims, 15 Drawing Figures

LINEAR STEPPING MOTOR

BACKGROUND OF THE INVENTION

1. Field of the Invention

The present invention relates to a linear stepping motor having its moving part, which steps in a straight line at a constant pitch conforming accurately to a pulse signal input and, in particular, to a linear step motor wherein exciting iron cores, provided with a plurality of field legs, are separated from each other in the direction perpendicular to the direction of movement of its moving part, and in which a magnetic field of a permanent magnet, and a magnetic field of an exciting coil are crossed at a right angle.

2. Description of the Prior Art

A linear stepping motor wherein exciting iron cores provided with a plurality of field legs are separated along the direction transverse to the direction of motion of a moving part is commonly known. In this type of linear stepping motor, a denticle, formed from a pair of exciting iron cores on the primary side or from a pair of non-exciting iron cores on the secondary side, must be secured integrally so as to offset the phase in the direction of motion of the moving part. Accordingly, in the case when, for example, a silicon steel plate is subjected to a punching press, and that silicon steel plates are laminated and a pair of exciting iron cores or a pair of unexcited iron cores are formed, at least two press molds are necessary to cope with the respective pair of exciting iron cores or a pair of unexcited iron cores, with the problem that the production cost is high.

In addition, conventionally, in the configuration in which a pair of exciting iron cores or a pair of unexcited iron cores are secured to a movable part or a stator, the magnetic resistance becomes large because of the configuration in which a component such as a bolt penetrates each iron core, so, in its turn the exciting current becomes large, giving rise to the problem that the temperature of the primary side becomes elevated.

SUMMARY OF THE INVENTION

An object of the present invention is to provide, with due consideration to the drawbacks of such conventional means, a solution to the above-mentioned problems by the provision of a linear stepping motor which can be constructed at low cost by providing one pair of iron cores in common as exciting iron cores on the primary side or unexcited iron cores on the secondary side.

In order to accomplish this object of the present invention, a linear stepping motor is provided with a pair of exciting iron cores which have a plurality of field legs formed from a plurality of denticles having a constant pitch $\tau$. When the number of poles of the linear stepping motor is P, and the number of phases is n, then the spacing of the field legs is $(N+(m/n))\cdot\tau$ (where N is an integer, m is an integer and m < n), and in the pair of exciting iron cores, the denticle is out of phase or offset in phase by no more than $(L/P)\cdot\tau$ (where L is an integer and L <P, 2L=/P). In addition, the denticles provided on one end section of the field legs on the exciting iron cores are out of phase by no more than $(L/P)\cdot\tau$ from the end surface of the exciting iron cores, and the pair of exciting iron cores have the same shape.

A second object of the present invention is to provide a linear stepping motor in which only a small amount of magnetic resistance is obtained, and in which the heat generated on the primary side is efficiently dispersed.

In order to accomplish this object of the present invention, the exciting iron cores are secured to a mounting section by means of a fastener plate provided with a plurality of engaging holes which freely engage the field leg on the exciting iron cores. A plurality of heat-radiation fins are also provided on the fastener plate.

BRIEF DESCRIPTION OF THE DRAWINGS

These and other objects, features and advantages of the present invention will become more apparent from the following description of preferred embodiments taken in conjunction with the accompanying drawings, in which.

DESCRIPTION OF THE PREFERRED EMBODIMENTS

Following is a description of the preferred embodiments of the present invention with reference to the drawings.

Figure 1:
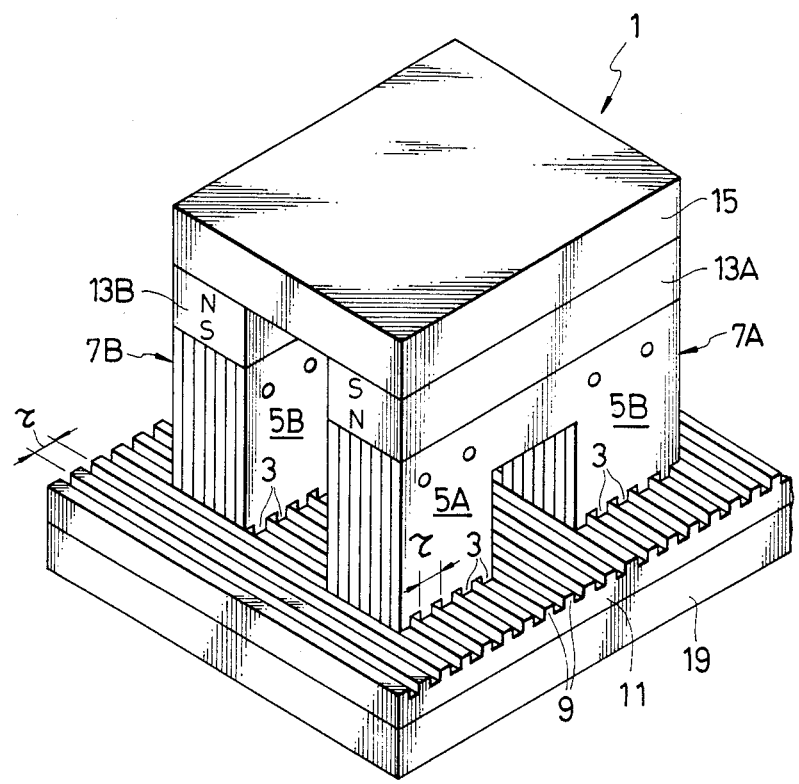
FIG. 1 is an oblique perspective drawing showing in outline the linear stepping motor of the present invention.

Now referring to FIG. 1, a linear stepping motor 1 of the present invention, generally indicated, comprises a pair of primary side exciting iron cores 7A, 7B having a plurality of field legs 5A, 5B formed from a plurality of denticles 3 having a constant pitch $\tau$, and a long secondary side non-exciting iron core 11 formed from a plurality of denticles 9, having a constant pitch $\tau$, which oppose the denticles 3. A pair of permanent magnets 13A, 13B are respectively mounted on the upper sections of the pair of excited iron cores 7A, 7B and form a magnetic field in the transverse direction as opposed to the direction of motion of the movable section of the linear stepping motor 1. These permanent magnets 13A, 13B are integrally linked through a yolk 15.

In this embodiment of the linear stepping motor of the present invention, the pair of primary side exciting iron cores 7A, 7B and their associated components form the movable portion of the linear stepping motor 1, while the secondary side non-exciting iron core 11 form the fixed portion. As will be later explained in detail, the secondary side non-exciting iron core 11 is secured at a suitable fixed section and the primary side exciting iron cores 7A, 7B are provided in a movable manner with respect to the non-exciting iron core 11.

Figure 2:
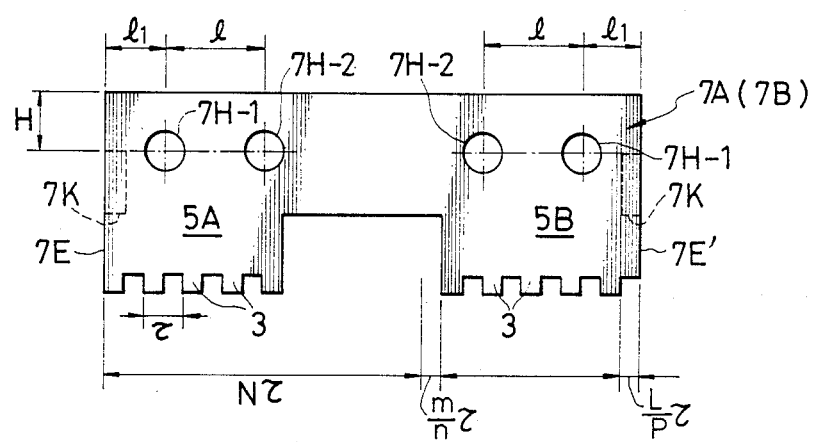
FIG. 2 is side elevation of the primary side exciting iron cores of the linear stepping motor of the present invention.

The exciting iron cores 7A, 7B are formed in the same shape. One of the exciting iron cores (for example, the exciting iron core 7B), as may be understood from FIG. 1, is constructed so that the advancing direction is reversed from front to back. The spacing of the field legs 5A, 5B on the exciting iron cores 7A, 7B, as shown clearly in FIG. 2, is $(N+(m/n))\cdot\tau$ (where N and m are integers and $m<n$; n is the number of phases of the linear stepping motor; in this embodiment, $n=2$). The denticles 3 on one suitable field leg (the field leg 5A in this embodiment) is formed so that there is no phase shift produced with respect to the end edge 7E of the exciting iron core 7A (7B). The denticles 3 on the other field leg (the field leg 5B in this embodiment) is formed so that there is a phase shift of no more than $(L/P)\cdot\tau$ from the other end 7E' of the exciting iron core 7A (7B) (where P is the number of poles in the linear stepping motor (the total number of field legs); in this embodiment $P=4$; and L is an integer meeting the conditions $L<P$ and $2L \ P$). A plurality of identically-formed through holes 7H-1 are positioned at a distance H from the top section of the exciting iron cores 7A, 7B and at a distance 11 from each of the end edges 7E and 7E'. In addition, a plurality of through holes 7H-2 are formed at a distance 1 from each of the through holes 7H-1.

As may be understood from the above configuration, the pair of exciting iron cores 7A, 7B are identically formed, and after the front and back (left and right in FIG. 2) of one suitable exciting iron core 7B is reversed, a bolt or pin penetrates each of the through holes 7H-1 and 7H-2, and by integrally building up the pair of exciting iron cores 7A, 7B, the denticles 3 of one exciting iron core 7A and the denticles 3 of the other exciting iron core 7B have a phase shift of no more than $(L/P)\cdot\tau$ (in this embodiment, $\frac{1}{4}\cdot\tau$). Specifically, when the pair of exciting iron cores 7A, 7B is formed, by a punching process in a press, from silicon steel plates to be laminated, only one press mold is required, so low production costs are obtained.

Furthermore, the construction by which the pair of exciting iron cores 7A, 7B are integrally built up, can be, for example, by the formation of a keyway 7K in each of the respective edges 7E and 7E' of the exciting iron cores 7A, 7B, and the insertion of a key into the keyway 7K, so that it is possible to construct an integrally built up pair of exciting iron cores 7A, 7B. In this case, by means of the construction by which through holes are formed in the exciting iron cores 7A, 7B, the magnetic resistance also becomes small, which is desirable.

Figure 3:
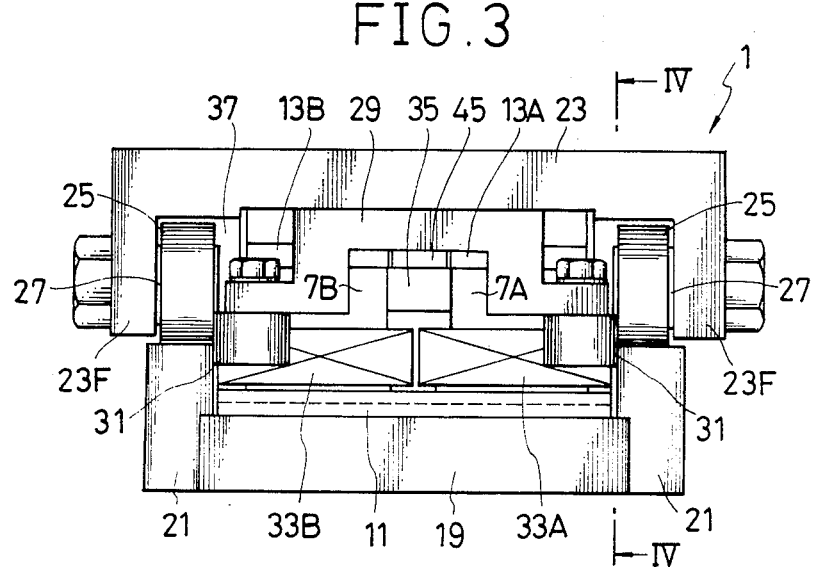
FIG. 3 is a front elevation of the linear stepping motor of the present invention.
Figure 4:
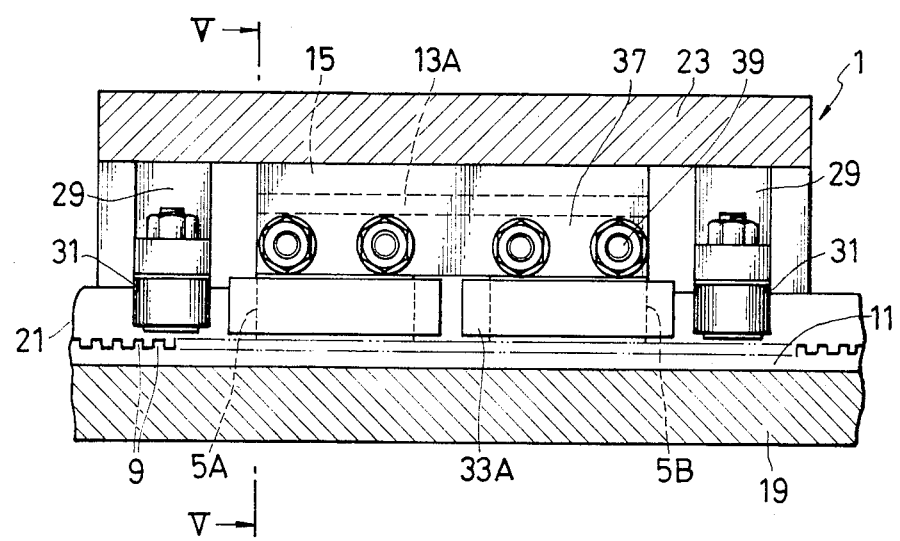
FIG. 4 is a sectional drawing viewed along the line IV—IV in FIG. 3.
Figure 5:
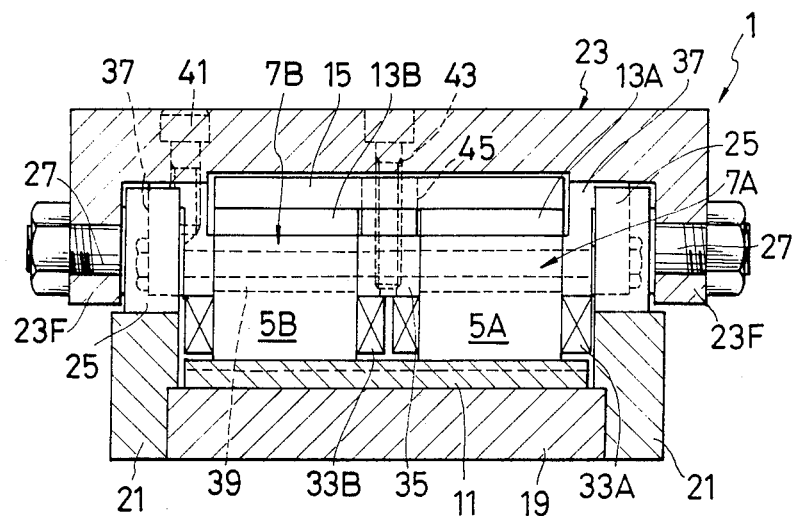
FIG. 5 is a sectional view along the line V—V in FIG. 4.

As shown in more detail in FIGS. 3, 4, and 5, in this embodiment of the present invention, the non-exciting iron core 11, which forms the fixed section of the linear stepping motor 1, is integrally secured on the top surface of a base 19, which extends in the left-right direction in FIG. 4, by a method such as the use of a bolt (not shown in the drawing). A plurality of guide rails 21 are positioned to provide a guide rail 21 on each side of the non-exciting iron core 11 in the direction perpendicular to the longitudinal direction. Each of the guide rails 21 is secured to the base 19 by means of a bolt or similar fastener. In this way, the pair of exciting iron cores 7A, 7B are mounted on a moving body 23 provided so that it moves freely along the guide rails 21. More specifically, the moving body 23 is in the form of a channel with a plurality of flanges 23F perpendicularly mounted on both ends of the direction transverse to the longitudinal direction of the guide rails 21. In a plurality of locations on the flanges 23F a plurality of rotatable wheels 25, movable on the upper surface of the guide rails 21 are supported in a rotatable manner through a shaft 27. In addition, a suitably-shaped roller bracket 29 is mounted close to both ends in the direction of motion of the moving body 23. A plurality of inner wheels 31 which touch the inner side surface of the guide rails 21 in a rotatable manner are mounted in a rotatable manner. Accordingly, the movable body 23 is able to move along the guide rails 21 without becoming separated from the guide rails 21.

Further, as shown in detail in FIGS. 3, 4, and 5, a plurality of exciting coils 33A, 33B are respectively wound around the field legs 5A, 5B on the pair of exciting iron cores 7A, 7B. The exciting coils 33A, 33B, by the application of electric power, produce a magnetic flux circuit in the advancing direction of the moving body 23 and in the direction parallel to it, and are used to control the attractive force of the field legs 5A, 5B on the exciting iron cores 7A, 7B. A spacer block 35 in the shape of a square bar is interposed between the pair of exciting iron cores 7A, 7B to maintain a suitable spacing. In addition, a plurality of iron core fastener plates 37 is provided, so that a fastener plate 37 is positioned on each side of the exciting iron cores 7A, 7B. The iron core fastener plates 37, the pair of exciting iron cores 7A, 7B, and the spacer block 35 are integrally assembled by means of a plurality of tie rods 39 which penetrate the through holes 7H-1, 7H-2, formed in the fastening plates 37 and the exciting iron cores 7A, 7B, and penetrate the spacer block 35. The pair of exciting iron cores 7A, 7B penetrate the moving body 23 and are integrally secured to the moving body 23 through a plurality of securing bolts 41 which are screwed to the iron core fastener plate 37. The denticles 3 on the pair of exciting iron cores 7A, 7B and the denticles 9 on the non-exciting iron core 11 are opposed to each other with a slight separation.

In order to maintain the optimum spacing between the denticles 9 on the non-exciting iron core 11 and denticles 3 on the field legs 5A, 5B of the pair of exciting iron cores 7A, 7B, a plurality of adjusting bolts 43, which penetrate the moving body 23 and the yoke 15 perpendicularly, engage the spacer block 35. An adjusting block 45, which regulates the upward movement of the spacer block 35, penetrates the yoke 15 and is interposed between the spacer block 35 and the movable body 23. Accordingly, by means of the adjusting bolts 43, the spacing between the denticles 3 on the exciting iron cores 7A, 7B and the denticles 9 on the non-exciting iron core 11 can be optimumly maintained so that the exciting iron cores 7A, 7B are not raised to any large extent. In addition, the attractive power of the denticles 3 and 9 is received by the moving body 23 through the plurality of adjusting bolts 43, and can prevent bending in the vicinity of the central section of the plurality of tie rods 39.

In a configuration mentioned above, by application of a suitable pulse current to the exciting coils 33A, 33B wound on the field legs 5A, 5B of the pair of exciting iron cores 7A, 7B, the movable section, which comprises the exciting iron cores 7A, 7B, is caused to appropriately step on the fixed section, which comprises the non-exciting iron core 11.

Because the principles of the stepping of a linear stepping motor are common knowledge, any further explanation will be omitted here. However, in this embodiment of the present invention, there are a total of four field legs 5A, 5B on the exciting iron cores 7A, 7B, and the spacing of the field legs 5A, 5B on the pair of exciting iron cores 7A, 7B is $(N+(\frac{1}{4}))\cdot\tau$. Furthermore, because the denticles 3 on the exciting iron cores 7A, 7B are shifted in phase by no more than $(\frac{1}{4})\cdot\tau$, the movable parts (the exciting iron cores 7A, 7B) step $\frac{1}{4}$ of the pitch $\tau$ of the denticles 3 at a time. As has already been explained, when the configuration is such that the total number of field legs is, for example, 6 or 8, the denticles on the pair of exciting iron cores are shifted in phase by no more than, for example, $(1/6)\cdot\tau$ or $(\frac{1}{8})\cdot\tau$, and the spacing of the field legs is set. Also, by suitably setting the number of phases, a $(1/6)\cdot\tau$ or $(\frac{1}{8})\cdot\tau$ stepping can be obtained.

In addition, in this embodiment, although it was explained that the pair of primary side exciting iron cores 7A, 7B are the movable part and the secondary side non-exciting iron core 11 is the fixed part, it is irrelevant which is movable and which is fixed. Therefore, it is possible to have a configuration in which the pair of primary side exciting iron cores 7A, 7B comprise the fixed part and the secondary side non-exciting iron core 11 comprises the movable part.

Figure 6:
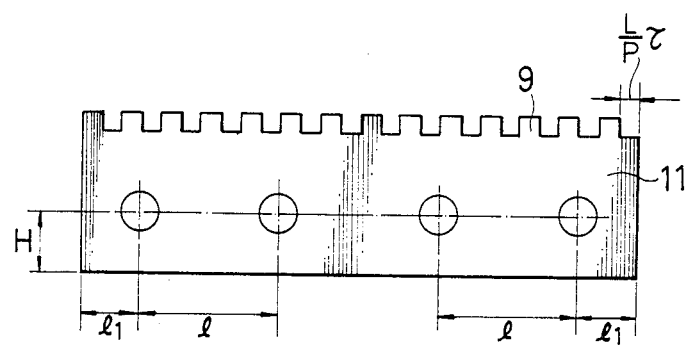
FIG. 6 is a side elevation of the secondary side iron core in the linear stepping motor.

Furthermore, although the denticles 3 on the exciting iron cores 7A, 7B are out of phase by no more than $(L/P)\cdot\tau$, the phases of the denticles 3 on the exciting iron cores 7A, 7B can be equivalent. Also, the non-exciting iron core 11 can be equivalent to the exciting iron cores 7A, 7B by, for example, being formed in two rows, so that it is possible to have a configuration in which the denticles of the two rows of the non-exciting iron core 11 are shifted phase by no more than $(L/P)\cdot\tau$. In this case, it is desirable to have a configuration in which the non-exciting iron core 11 is shaped as shown in FIG. 6.

Figure 7:
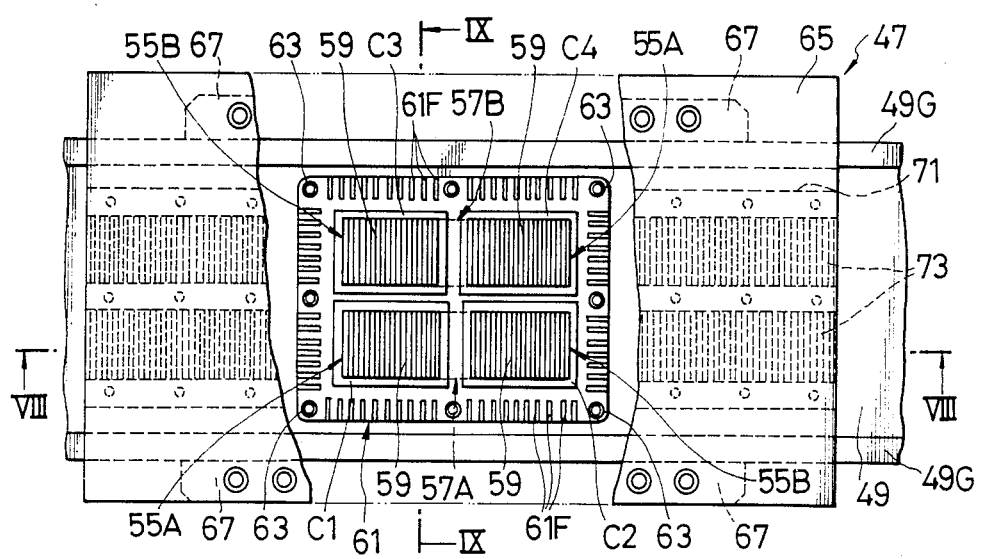
FIG. 7 is a plan view of another embodiment of a linear stepping motor, cutting away in part.
Figure 8:
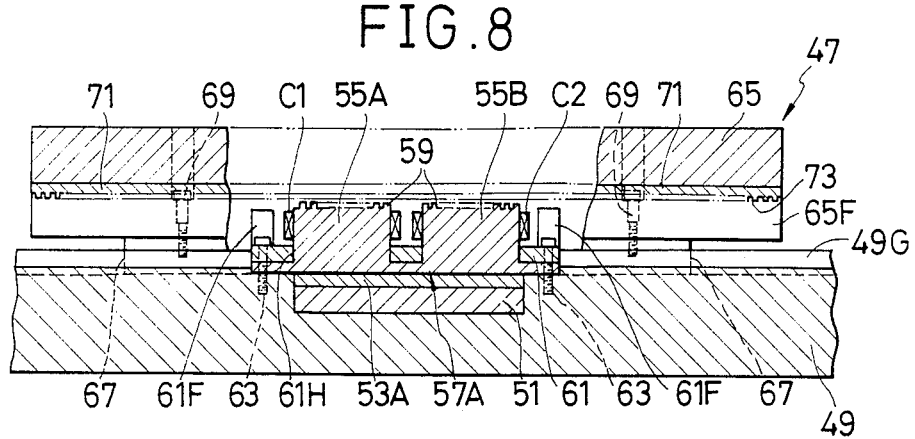
FIG. 8 is a sectional drawing viewed along the line VIII—VIII in FIG. 7.
Figure 9:
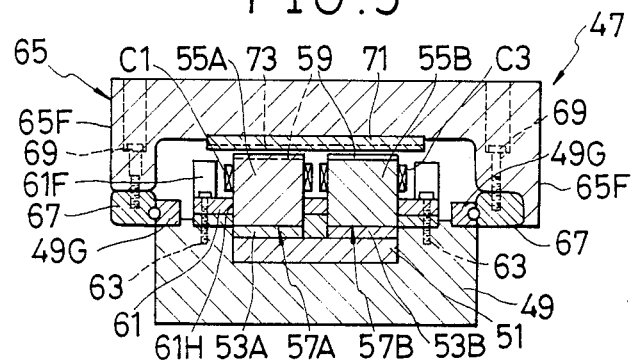
FIG. 9 is a sectional drawing viewed along the line IX—IX in FIG. 7.

Now referring to FIGS. 7, 8, and 9, here another embodiment of the linear stepping motor of the present invention is shown. This other embodiment of a linear stepping motor 47 has the configuration in which, at almost dead center of a base 49 elongated in the left-right direction, a primary side is fixed and a secondary side is supported so that it is movable upon the base 49.

Specifically, a plurality of guide rails 49G, which are oriented in the longitudinal direction of the base 49, are secured to provide a guide rail on each side of the base 49. A yoke 51 in the shape of a flat plate, made from a material with good magnetic permeability, is imbedded in the center section in the longitudinal direction of the base 49. A plurality of permanent magnets 53A, 53B are mounted on the upper surface of the yoke 51, extending along the longitudinal direction of the base 49 and being separated along the direction perpendicular to the longitudinal direction of the base 49. A pair of exciting iron cores 57A, 57B, which are provided with a plurality of field legs 55A, 55B facing upward, are mounted on the permanent magnets 53A, 53B. By means of this configuration, the magnetic field from the permanent magnets 53A, 53B is formed in the direction perpendicular to the longitudinal direction of the base 49. The exciting iron cores 57A, 57B are constructed the same as the exciting iron cores 7A, 7B with the exception that no through holes are provided for assembly and a detailed drawing for them are omitted. The denticles 59 are formed with a constant pitch $\tau$ on the upper surfaces of the field legs 55A, 5B, while a plurality of exciting coils C1, C2, C3, and C4 is provided so that the exciting coils are wrapped around the field legs 55A, 55B of the exciting iron cores 57A, 57B. The spacing of the field legs 55A, 55B on the exciting iron cores 57A, 57B and the effect of the denticles 59 formed on the field legs 55A, 55B are the same as the effect of the field legs 5A, 5B which was explained with respect to FIG. 1 and FIG. 2. The effect of the exciting iron cores 57A, 57B is also the same as the effect of the exciting iron cores 7A, 7B. Accordingly, further explanation of the exciting iron cores 57A, 57B is omitted.

A fastener plate 61 provided to secure the exciting iron cores 57A, 57B to the base 49 is formed in an almost square shape. A plurality of engaging holes 61H are formed in the plate 61, in which the field legs 55A, 55B of the excited iron cores 57A, 57B are engaged. Further, a plurality of heat-radiating fins 61 are formed on the upper surface of the fastener plate 61. The fastener plate 61 is secured by a plurality of bolts 63 which penetrate the peripheral edge section of the fastener plate 61. By securing the fastener plate 61 in this manner, the exciting iron cores 57A, 57B are caused to be secured to the magnets 53A, 53B by the application of pressure, and the magnets 53A, 53B are secured to the yoke 51 by the application of pressure.

Accordingly, as has already been explained, because no holes are drilled in components such as the exciting iron cores 57A, 57B or the yoke 51 for assembly purposes, the primary side magnetic resistance becomes very low. Also, the heat generated in the primary side is radiated by the heat-radiation fins 61F formed on the fastener plate 61 so that the primary side is effectively cooled.

The secondary side of the linear stepping motor 47 is supported in a movable manner on the guide rails 49G which are secured to the base 49. Specifically, a channel-shaped moving body 65 is positioned on the upper part of the base 49, and a plurality of sliding members 67, such as linear motion bearings supported in an engageable and slidable manner on the guide rails 49G are mounted by means of a plurality of bolts 69 on a plurality of flange sections 65F provided on both sides of the moving body 65. In addition, the field legs 55A, 55B of the pair of exciting iron cores 57A, 57B and the opposing non-exciting iron core 71 are integrally secured to the underside of the movable body 65. A plurality of denticles 73 of the same pitch as the denticles 59 formed on the field legs 55A, 55B is formed on the underside of the non-exciting iron core 71.

Owing to this configuration, when an appropriate pulse current is applied to the exciting coils C1, C2, C3, and C4 which are wrapped around the field legs 55A, 55B the magnetic field from the exciting coils C1, C2, C3 and C4 is formed in the longitudinal direction of the base 49. The magnetic field from the magnets 55A, 55B is formed in the transverse mode, and causes suitable stepping of the moving body 65.

Figure 10:
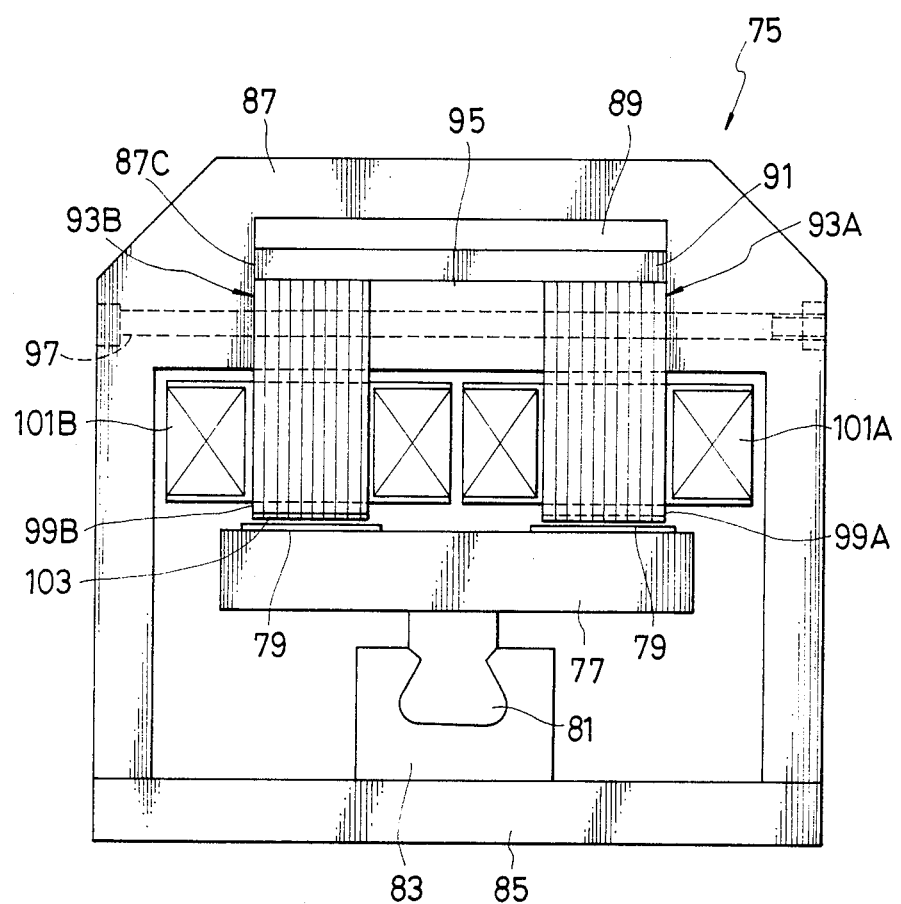
FIG. 10 is a front elevation showing still another embodiment of a linear stepping motor.

Now referring to FIG. 10, a yet additional embodiment of the present invention, a linear stepping motor 75, is shown. In this linear stepping motor 75, the secondary side is fixed and the primary side is formed to be movable with respect to the secondary side.

Specifically, two rows of denticles 79 of a common pitch τ are formed on the upper surface of a base 77 which extends horizontally and is supported at both ends by a suitably secured section. A guide rail 81 is integrally formed on the underside of the base 77. A sliding member 83 is supported and guided in a slidable manner on the guide rail 81. A support plate 85 is mounted horizontally on the sliding member 83. A comparatively large space is maintained between the support plate 85 and the base 77, and a movable body 87 which encloses the base 77 is supported on the support plate 85.

A concave section 87C, which is open in the lower direction, is formed on the lower surface of the upper section of the movable body 87. A pair of exciting iron cores 93A, 93B are positioned on the lower surface of a yoke 89. The yoke 89 is positioned within the concave section 87C and secured by a pair of permanent magnets 91 which are separated in the direction of motion of the moving body 87. The exciting iron cores 93A, 93B are offset in the direction transverse to the direction of motion of the moving body 87. A suitable spacer 95 is interposed between the pair of exciting iron cores 93A, 93B. The exciting iron cores 93A, 93B are secured to the moving body 87 by a plurality of clamping bolts 97 which penetrate the moving body 87 and the spacer 95 in the horizontal direction. In addition, a plurality of exciting coils 101A, 101B are respectively wrapped around a plurality of field legs 99A, 99B which are formed on the exciting iron cores 93A, 93B. Further, a plurality of denticles 103 which are in opposition to the denticles 79 formed on the base 77, are formed on the lower surface of the field legs 99A, 99B at a common pitch τ. A more detailed drawing has been omitted for the exciting iron cores 93A, 93B which are constructed the same as the previously mentioned exciting iron cores 7A, 7B.

As a result of this configuration, in this embodiment of the linear stepping motor 75, suitable stepping of the movable body 87 in the longitudinal direction of the base 77 can be obtained by the suitable application of a pulse current to the exciting coils 101A, 101B.

Figure 11:
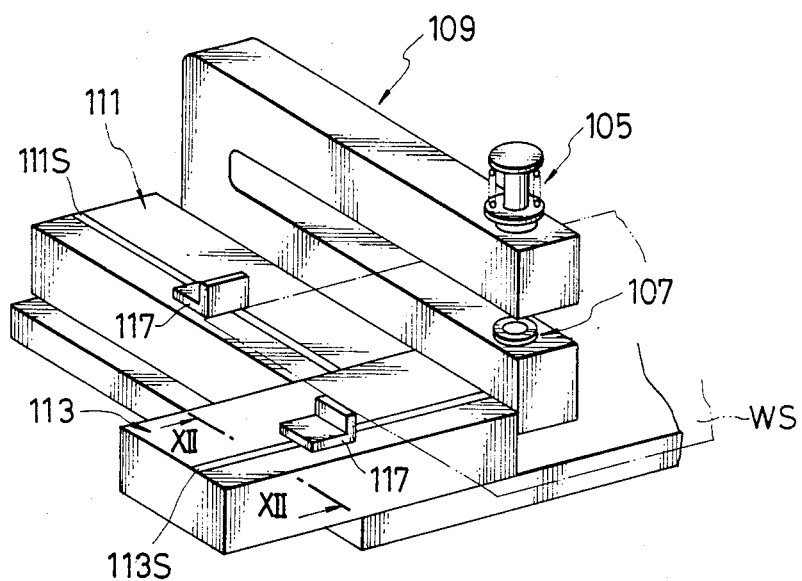
FIG. 11 is an oblique perspective drawing of a punching unit showing a general example of a practical application of a linear stepping motor.
Figure 12:
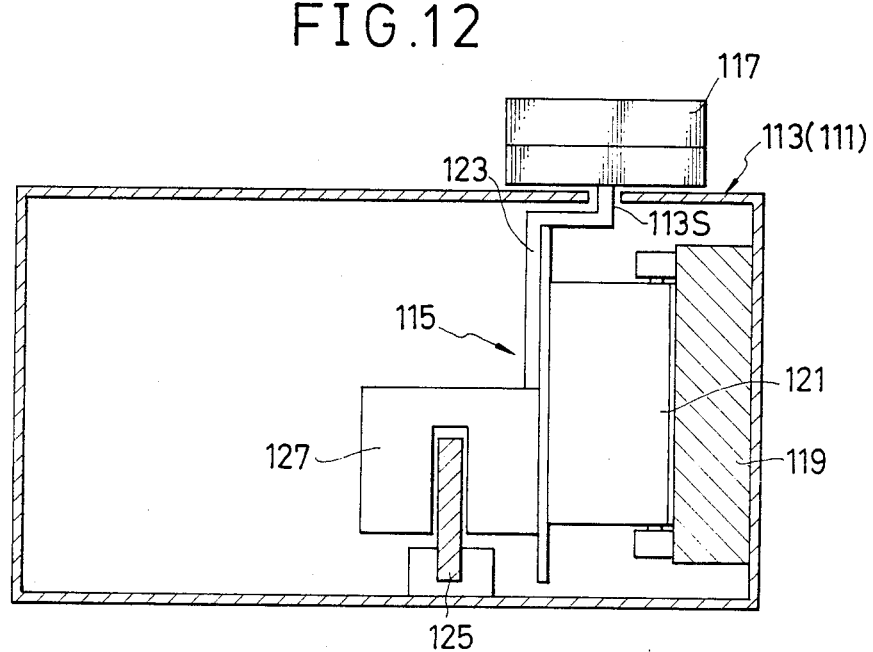
FIG. 12 is an enlarged sectional drawing viewed along the line XII—XII in FIG. 11.

Each type of linear stepping motor constructed according to the configurations outlined above can conform to various types of installations. For example, as shown in FIG. 11, a linear stepping motor can be used as a positioning device for a punching unit provided with an upper mold 105 and a lower mold 107 for carrying out a punching process on a worksheet WS. Specifically, as shown in FIG. 11 and FIG. 12, a plurality of box-shaped guide cases 111, 113 are provided, extended along the front and back direction and in the left and right direction on the punching unit 109. A stopper 117 is formed as a movable positioner to position the worksheet WS by means of a linear stepping motor 115 provided in the guide cases 111, 113. The configuration of the linear stepping motor has already been explained so only a general explanation is included here.

Specifically, as indicated in FIG. 12, a stator 119 of a linear stepping motor 115 is secured vertically on the inner side surfaces of the guide cases 111, 113, the denticles of the stator 119 and the denticles of the movable part 121 which opposes the stator 119 are provided vertically. It is desirable to have a configuration by which dust is unable to settle. The movable part 121 and the stopper 117 are connected through a suitably-formed connecting member 123 which passes through a plurality of slits 111S and 113S which are formed in the guide cases 111 and 113 respectively. In addition, it is desirable to have a sensor 127 conforming to a linear scale 125 provided in the guide cases 111, 113 mounted on the movable part 121 to detect the position of the movable part 121.

With this configuration it is possible to carry out positioning of the movement of the stopper at a higher speed than in the case where a ball screw mechanism is adopted as a positioning mechanism for the stopper. In addition, the shock at the time when the worksheet touches against the stopper is absorbed by the attractive power to maintain the movable part in a fixed position. This configuration therefore provides satisfactory absorption of the shock and positioning of the worksheet.

Figure 13:
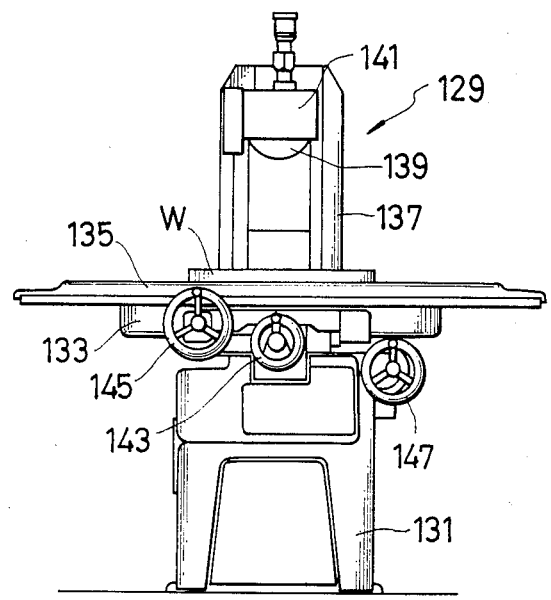
FIG. 13 is a front elevation of a grinding machine, shown as an example of the practical application of a linear stepping motor.

A further example of the practical application of a linear stepping motor is shown in FIG. 13, in a grinding machine 129. Specifically, in this conventional type of a grinding machine 129, a table 135, which is supported so that it can move reciprocally in the left and right directions, supports a workpiece W on a saddle 133, which is in turn supported so that it is movable in the forward and backward directions on a frame 131. A processing head 141, which supports a grinding wheel 139 in a freely rotatable manner on a column 137 supported vertically on the frame 131, is supported so that it is movable in the vertical direction. In the grinding machine 129 of this construction, there is generally provided, in a rotatable manner, a handle 143 to move the saddle 133 in the forward and backward directions, a handle 145 to move the table 135 reciprocally in the left and right directions, and a handle 147 to move the processing head 141 in the vertical direction. In the case where a linear stepping motor of the previously outlined configuration is applied practically in a grinding machine of such construction, it is possible to adopt the linear stepping motor as a drive device for the reciprocal movement of the sliding saddle 133 or the table 135.

Figure 14:
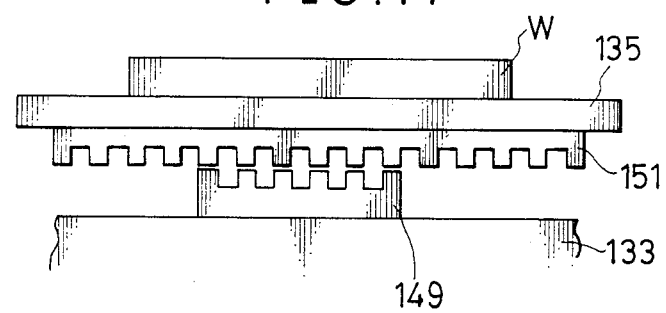
FIG. 14 is a front elevation generally showing the principal part indicated in FIG. 13.

In more detail, as shown in FIG. 14, there is the configuration where, for example, the primary side of the linear stepping motor is mounted as a stator 149 on the upper surface of the sliding saddle 133, and the secondary side is mounted on the lower surface of the table 135 as the movable part 151. There is also the configuration in which the mounting relationships of the primary and secondary sides are reversed. Then, it is desirable to have a configuration in which the position of the table 135 is detected by the provision of a suitable position sensor which controls the stroke of the table 135.

Figure 15:
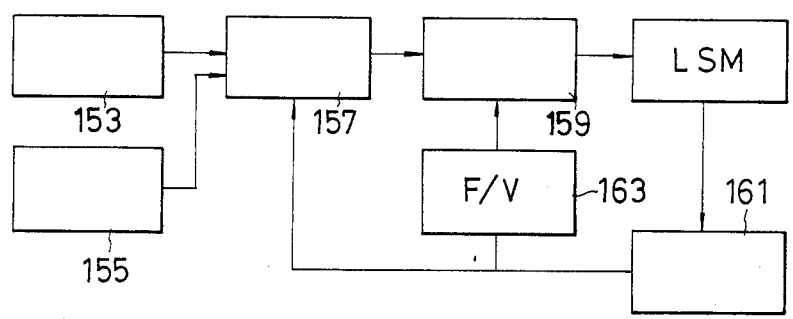
FIG. 15 is a block diagram showing the control circuit of a linear stepping motor.

A desirable configuration for a control circuit to control the above-mentioned types of linear stepping motors is, for example, as shown in FIG. 15. Specifically, a velocity command circuit 153 and a stroke length command circuit 155 are connected by a pulse distributor circuit 157. The pulse distributor circuit 157 is connected to a linear stepping motor LSM through an amplifier circuit 159. A position sensor 161 is attached to the linear stepping motor LSM. The position sensor 161 is connected to the pulse distributor circuit 157 and to the amplifier 159 through an F/V converter 163 which converts the pulse frequency from the position sensor 161 to a voltage.

By means of this configuration, the pulse current to be applied to the exciting coils of the linear stepping motor LSM is distributed by the pulse distributor circuit 157 based on the input values from the velocity command circuit 153 and the stroke length command circuit 155. The distributed pulse current is amplified in the amplifier circuit 159 and is applied to the exciting coils of the linear stepping motor LSM to cause stepping of the linear stepping motor LSM. The position reached by the linear stepping motor LSM in the stepping action is detected by the position sensor 161 and is fed back by the pulse distributor circuit 157. The pulse frequency is converted to voltage by the F/V converter 163, and is input to the amplifier circuit 159. Accordingly, the value output from the amplifier circuit 159 to the linear stepping motor LSM is based on the difference between the value input from the pulse distributor circuit 155 and the value input from the F/V converter 163.

Although only preferred embodiments are specifically illustrated and described herein, it will be appreciated that many modifications and variations of the present invention are possible in light of the above teachings and within the purview of the appended claims without departing from the spirit and intended scope of the invention.

What we claim is:

1. A linear stepping motor comprising:
   a long non-exciting iron core formed with a number of denticles having a constant pitch $\tau$;
   a first exciting core having two field legs formed with a number of denticles having a constant pitch $\tau$, a first field leg of said two field legs arranged to provide no phase shift with respect to the denticles of said non-exciting iron core, a second field leg arranged to provide a phase shift of no more than $(L/P)\cdot\tau$ with respect to the same denticles of said non-exciting iron core, where L denotes an integer smaller than the number of field leg poles P;
   a second exciting core having the same shape and dimension of said first exciting core and having two field legs formed with a number of denticles having the constant pitch $\tau$, a first field leg of said two field legs arranged to provide a phase shift of no more than $(L/P)\cdot\tau$, a second field leg arranged to provide no phase shift with respect to the denticles of said non-exciting iron core in diagonal phase-shift positional relationship between the field legs of said two exciting cores;
   a pair of permanent magnets respectively mounted on said two excited iron cores; and
   a yoke mounted on said pair of permanent magnets to form a magnetic field in a transverse direction of a longitudinal motion of said linear stepping motor.

2. A linear stepping motor as set forth in claim 1, wherein said long non-exciting iron core is fixed, and said first and second exciting cores are movable.

3. A linear stepping motor as set forth in claim 1, wherein said long non-exciting iron core is movable, and said first and second exciting cores are fixed.

4. A linear stepping motor as set forth in claim 1, which further comprises a fastener plate fastened to said first and second exciting cores and formed with a plurality of heat-radiating fins.

* * * * *